United States Patent
Okamoto et al.

(10) Patent No.: US 11,015,510 B2
(45) Date of Patent: May 25, 2021

(54) CATALYST DETERIORATION DIAGNOSIS SYSTEM AND CATALYST DETERIORATION DIAGNOSIS METHOD

(71) Applicant: NGK INSULATORS, LTD., Nagoya (JP)

(72) Inventors: Taku Okamoto, Nagoya (JP); Osamu Nakasone, Inabe (JP)

(73) Assignee: NGK INSULATORS, LTD., Nagoya (JP)

( * ) Notice: Subject to any disclaimer, the term of this patent is extended or adjusted under 35 U.S.C. 154(b) by 0 days.

(21) Appl. No.: 16/566,922

(22) Filed: Sep. 11, 2019

(65) Prior Publication Data
US 2020/0095917 A1    Mar. 26, 2020

(30) Foreign Application Priority Data
Sep. 21, 2018 (JP) .............................. JP2018-177125

(51) Int. Cl.
*F01N 11/00* (2006.01)
*F01N 3/10* (2006.01)
*F02D 41/02* (2006.01)

(52) U.S. Cl.
CPC .............. *F01N 11/00* (2013.01); *F01N 3/101* (2013.01); *F01N 11/007* (2013.01); *F01N 2430/06* (2013.01); *F01N 2550/02* (2013.01); *F01N 2560/026* (2013.01); *F01N 2900/1624* (2013.01); *F02D 41/0235* (2013.01); *F02D 2200/0814* (2013.01)

(58) Field of Classification Search
CPC .. F01N 3/101; F01N 11/007; F01N 2560/025; F01N 2560/026; F02D 41/1454; F02D 2200/0814
See application file for complete search history.

(56) References Cited

U.S. PATENT DOCUMENTS

| 2015/0152769 | A1  | 6/2015 | Aoki et al. | |
| 2016/0025026 | A1* | 1/2016 | Kitaura | F02D 41/1454 60/276 |
| 2017/0145939 | A1* | 5/2017 | Okazaki | F02D 41/1475 |

FOREIGN PATENT DOCUMENTS

| JP | 2006-017078 A | 1/2006 |
| JP | 5835478 B2 | 12/2015 |

* cited by examiner

Primary Examiner — Jonathan R Matthias
(74) Attorney, Agent, or Firm — Mattingly & Malur, PC

(57) ABSTRACT

A catalyst deterioration diagnosis system includes an air-fuel ratio detection element and a NOx detection element on a downstream side with respect to a catalyst, and a control element. The control element causes an engine to perform diagnosis operation performed with an exhaust gas temperature being kept at 600° C. or higher, such that at a timing when a downstream air-fuel ratio in a lean operation state reaches a threshold value, the engine is transitioned to a rich operation state, and at a timing that is a predetermined period after a downstream air-fuel ratio in a rich operation state reaches a threshold value, the engine is transitioned to a lean operation state. The diagnosis element compares NOx concentration during the rich operation state to a diagnosis threshold value, thereby to diagnose a degree of deterioration of NOx reduction capability of the catalyst.

4 Claims, 5 Drawing Sheets

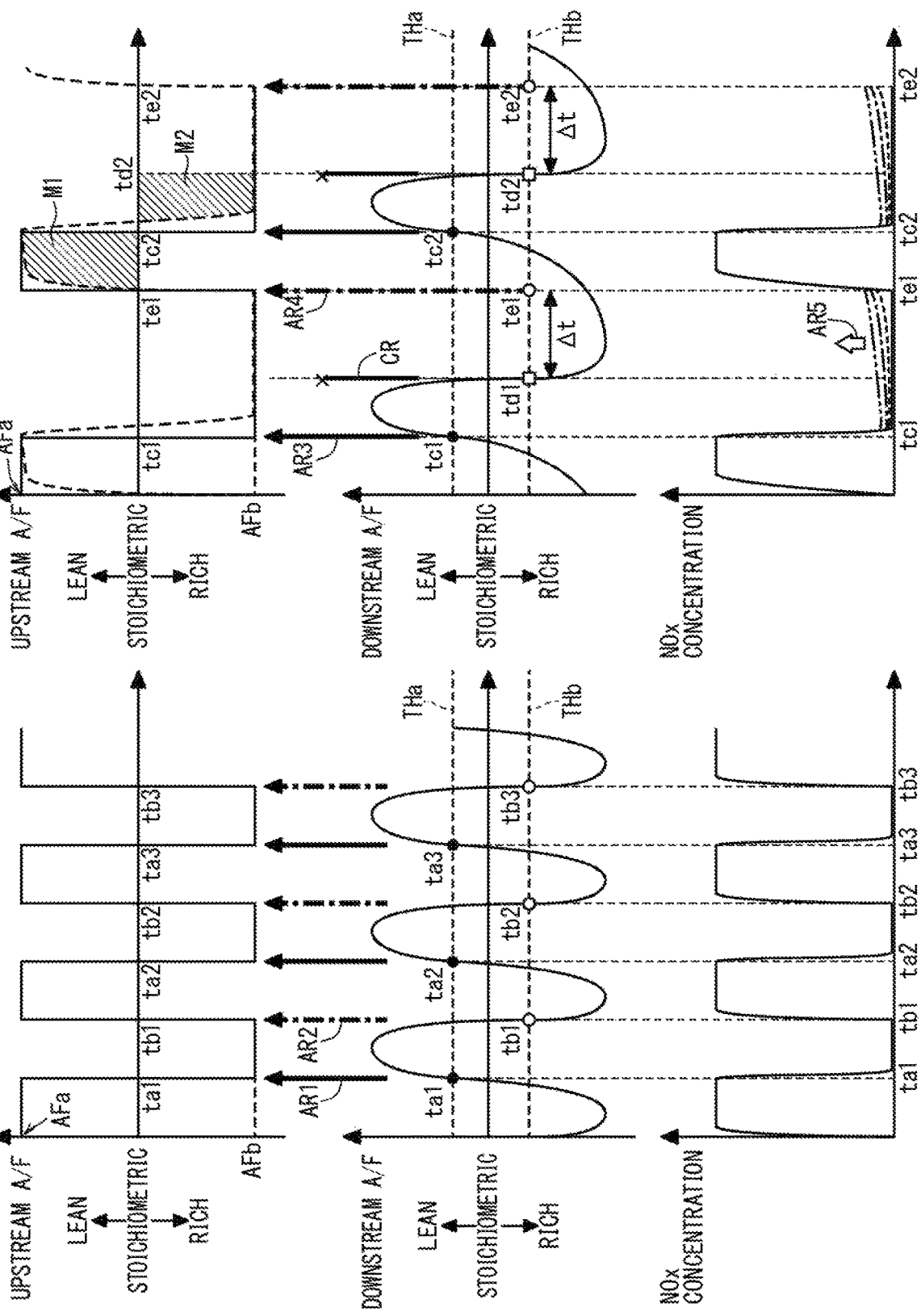

CATALYST DETERIORATION DIAGNOSIS SYSTEM AND CATALYST DETERIORATION DIAGNOSIS METHOD

CROSS-REFERENCE TO RELATED APPLICATION

The present application claims priority from Japanese application JP 2018-177125, filed on Sep. 21, 2018, the contents of which is hereby incorporated by reference into this application.

BACKGROUND OF THE INVENTION

Field of the Invention

The present invention relates to a system and a method with which a deterioration degree of a catalyst is diagnosed, and more particularly to a diagnosis system and a diagnosis method for a catalyst into which an exhaust gas from an internal combustion engine is introduced.

Description of the Background Art

A gasoline engine mounted in a vehicle (typically, an automobile) emits an exhaust gas containing toxic substances, namely, nitrogen oxide (NOx), total hydrocarbon (THC), and carbon monoxide (CO), during of operation. Therefore, in many gasoline engine vehicles, a catalyst that collectively removes these three contained substances (purifies an exhaust gas), i.e., a three way catalyst (TWC), is mounted.

The three way catalyst includes a part made of precious metal, such as palladium (Pd), platinum (Pt), and rhodium (Rh), and a part made of ceramics mainly containing ceria ($CeO_2$). The part made of precious metal exerts main catalytic action. The part made of ceramics serves as a promoter. Pd and Pt have a function of oxidizing HC and CO in an exhaust gas to generate carbon dioxide ($CO_2$) and water ($H_2O$). Further, Pd and Rh have a function of reducing NOx in an exhaust gas to generate nitrogen ($N_2$). Ceria has a function of causing absorption and elimination of oxygen ($O_2$). In the TWC, when HC and CO are oxidized, necessary oxygen is released from ceria, and when NOx is reduced, generated oxygen is absorbed into (stored in) ceria.

A gasoline engine has its air-fuel ratio (A/F) equal to a stoichiometric air-fuel ratio or has a value close to a stoichiometric air-fuel ratio. Mainly operated in a stoichiometric state in which fuel introduced into an engine cylinder is completely burned, depending on a condition of a vehicle, operation is performed with an operation state appropriately transitioned also to a lean state in which A/F is higher than a stoichiometric state or to a rich state in which A/F is lower than a stoichiometric state. In the stoichiometric state out of these states, a TWC can remove all HC, CO, and NOx at a high removal rate.

More specifically, a removal rate of a TWC with regard to NOx is relatively high during rich operation (in a reduced atmosphere) and during stoichiometric operation, and is relatively low during lean operation (in an atmosphere with excessive oxygen). Conversely, a removal rate of a TWC with regard to HC and CO is relatively high during lean operation and during stoichiometric operation, and is relatively low during rich operation. This is because an oxygen content in an exhaust gas during rich operation is low and therefore NOx can be easily reduced during rich operation, and an oxygen content in an exhaust gas during lean operation is high and therefore HC and CO can be easily oxidized during lean operation.

A TWC is deteriorated through long-term continuous use. A TWC is deteriorated in various manners. Some of main deterioration modes include overall removal efficiency reduction in a rich state and a lean state, removal efficiency reduction in a lean state, and removal efficiency reduction in a rich state.

Meanwhile, in recent years, automobiles are required by law to implement on-board diagnostics (OBD), and TWC is included in a target thereof.

OBD on TWCs may be implemented with an oxygen storage capacity (OSC) method, for example. This is based on the premise that removal capability of a three way catalyst is higher as oxygen absorption capability (oxygen storage amount) of ceria is higher, and deterioration of a TWC appears as deterioration in oxygen absorption capability (oxygen storage amount) of ceria.

A Cmax method as one aspect of an OSC method has been known (see, for example, Japanese Patent Application Laid-Open No. 2006-17078 and Japanese Patent No. 5835478).

However, an OSC method, such as a Cmax method, only allows evaluation of a deterioration degree of oxygen absorption capability of ceria provided in a TWC, and deterioration behavior of a precious metal part for causing oxidation and reduction directly related to removal cannot be directly understood.

Further, there is also a problem in that an oxygen absorption amount of ceria provided in a TWC has a small correlation with gas components contained in an exhaust gas from an engine, such as HC, CO, and NOx.

SUMMARY

The present invention relates to a diagnosis of a deterioration degree of a catalyst into which an exhaust gas from an internal combustion engine is introduced, and is more particularly directed to a diagnosis system and a diagnosis method.

The present invention is directed to a system for diagnosing a deterioration degree of a catalyst that purifies an exhaust gas emitted from an internal combustion engine. The catalyst is provided in an exhaust path for the exhaust gas from the internal combustion engine. A side on the catalyst with respect to the internal combustion engine is defined as an upstream side with respect to the catalyst in the exhaust path. A side on an opposite side of the upstream side is defined as a downstream side with respect to the catalyst in the exhaust path. The system includes a downstream air-fuel ratio detection element, a NOx detection element, an operation control element, a diagnosis element, and a storage element. The downstream air-fuel ratio detection element is provided on the downstream side in the exhaust path. The NOx detection element is provided on the downstream side in the exhaust path. The operation control element is configured to control air intake and fuel injection to the internal combustion engine, thereby to control an operation state of the internal combustion engine. The diagnosis element is configured to diagnose a deterioration degree of the catalyst. The storage element is configured to store diagnosis threshold values determined in advance. The operation control element is configured to be capable of causing the internal combustion engine to perform diagnosis operation. In the diagnosis operation, under control performed by the operation control element, a temperature of the exhaust gas is kept at a predetermined diagnosis temperature of 600° C. or higher. When the internal combustion engine is in a lean operation state, at a timing when a downstream air-fuel ratio reaches a predetermined lean threshold value, the internal combustion engine is caused to transition to a rich operation state. When the internal combustion engine is in a rich operation state, at a timing that is a predetermined period after the timing when a downstream air-fuel ratio reaches a predetermined rich threshold value, the internal combustion engine is caused to transition to a lean operation state. The lean state is an operation state of the internal combustion engine when an air-fuel ratio of the exhaust gas emitted from the internal combustion engine is larger than a stoichiometric value. The rich operation state is an operation state of the internal combustion engine when an air-fuel ratio of the exhaust gas emitted from the internal combustion engine is smaller than a stoichiometric value. The downstream air-fuel ratio is an air-fuel ratio of the exhaust gas on the downstream determined based on a detection result obtained by the downstream air-fuel ratio detection element. The diagnosis element compares NOx concentration on the downstream side determined based on a detection result obtained by the NOx detection element during the rich operation state to a first diagnosis threshold value of the diagnosis threshold values, thereby to diagnose a degree of deterioration of NOx reduction capability of the catalyst.

According to the invention, a diagnosis of a degree of deterioration can be conducted concerning NOx reduction capability of a precious metal component of a three way catalyst.

Preferably, the catalyst deterioration diagnosis system according to the present invention further includes an upstream air-fuel ratio detection element. The upstream air-fuel ratio detection element is configured to detect an air-fuel ratio of the exhaust gas on the upstream side of the exhaust path. The diagnosis element further compares an average oxygen absorption amount of the catalyst calculated as an average value of an oxygen absorption amount of the catalyst in one absorption and an oxygen release amount of the catalyst in one release to a second diagnosis threshold value of the diagnosis threshold values, thereby to diagnose a degree of deterioration of oxygen absorption capability of the catalyst. The oxygen absorption amount is calculated by integrating a difference value between an upstream air-fuel ratio and a stoichiometric value with respect to time from when the upstream air-fuel ratio has a stoichiometric value or more to when the downstream air-fuel ratio reaches the lean threshold value. The oxygen release amount is calculated by integrating a difference value between an upstream air-fuel ratio and a stoichiometric value with respect to time from when the upstream air-fuel ratio has a stoichiometric value or less to when the downstream air-fuel ratio reaches the rich threshold value. The upstream air-fuel ratio is an air-fuel ratio of the exhaust gas on the upstream side determined based on an air-fuel ratio detection value obtained by the upstream air-fuel ratio detection element.

According to the invention, a diagnosis of a degree of deterioration can be conducted also concerning oxygen absorption capability of a three way catalyst, as well as NOx reduction capability. Moreover, these diagnoses can be conducted in parallel, and there is no correlation between manners of deterioration of both the NOx reduction capability and the oxygen absorption capability. Therefore, as compared to a known method, a state of deterioration of a three way catalyst can be understood in more detail.

Therefore, an object of the present invention is to provide a system and a method with which a degree of deterioration of a precious metal component of a TWC can be preferably diagnosed.

These and other objects, features, aspects and advantages of the present invention will become more apparent from the following detailed description of the present invention when taken in conjunction with the accompanying drawings.

BRIEF DESCRIPTION OF THE DRAWINGS

FIG. 2A and FIG. 2B are two sets of graphs contrastingly showing a control mode of an engine 500 when a deterioration diagnosis according to this embodiment is conducted, and a control mode of the engine 500 in a known and general Cmax method.

DESCRIPTION OF THE PREFERRED EMBODIMENTS

<Configuration of System>

Figure 1:
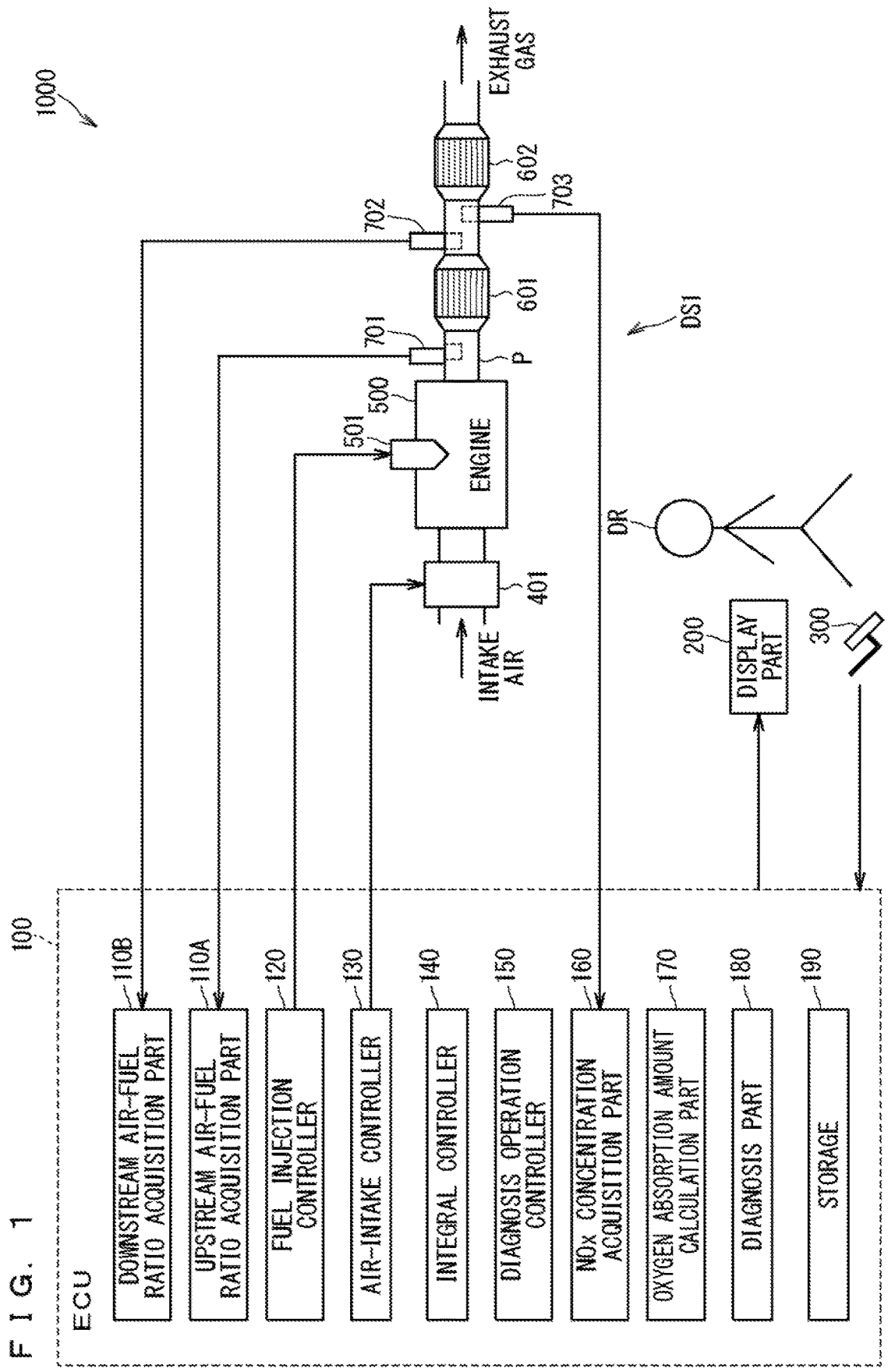
FIG. 1 is a diagram schematically illustrating a configuration of a vehicle 1000.
Figure 3A:
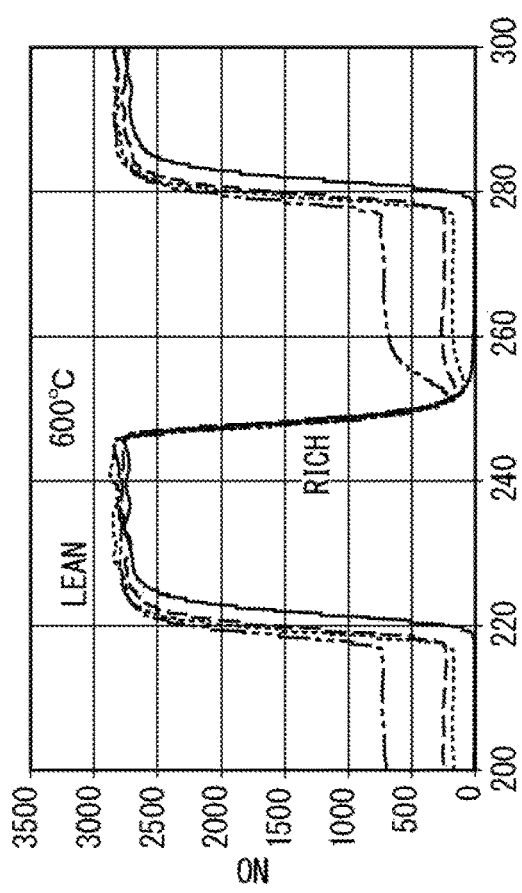
FIG. 3A to FIG. 3D are graphs in which time-dependent changes of NOx concentration are organized for respective exhaust gas temperatures in cases where four TWCs 601 with different degrees of deterioration are mounted in the vehicle 1000, respectively.
Figure 3B:
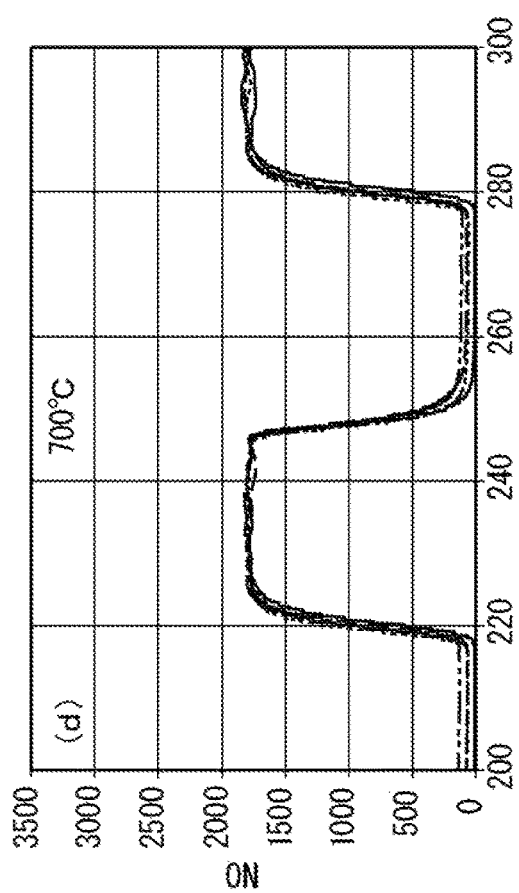
Figure 3C:
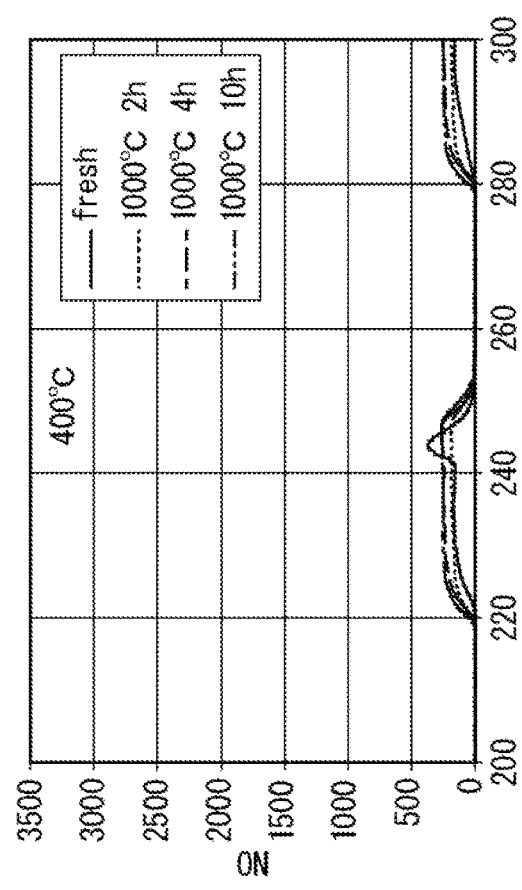
Figure 3D:
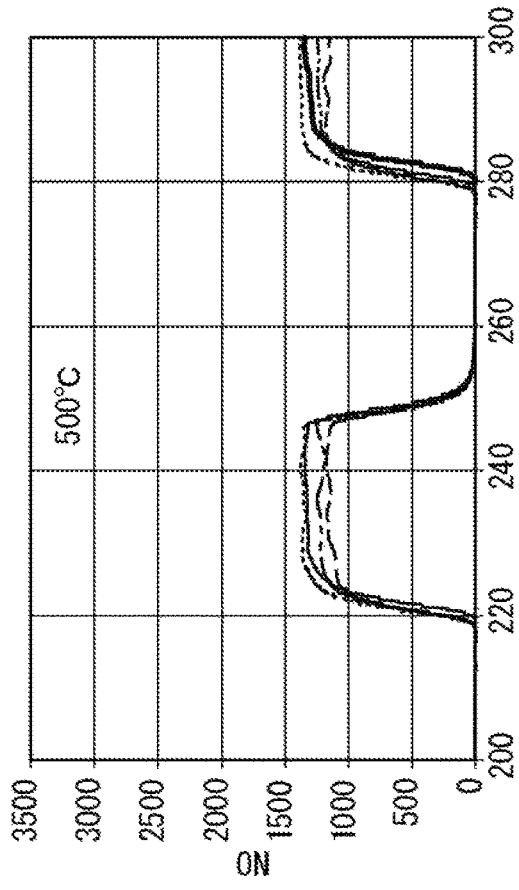

FIG. 1 is a diagram schematically illustrating a configuration of a vehicle (system) 1000 according to this embodiment. In this embodiment, the vehicle 1000 is an automobile driven by a driver DR.

The vehicle 1000 mainly includes a gasoline engine (hereinafter simply referred to as an engine) 500 that is a type of an internal combustion engine and serves as a source of power, a fuel injection device 501 that injects fuel into the inside (combustion chamber) of the engine 500, an air-intake unit 401 that supplies air to the engine 500, a three way catalyst (TWC) 601 that purifies an exhaust gas emitted from the engine 500, an electronic control device (ECU) 100 that controls operation of each part of the vehicle 1000, a display part 200 such as an instrument panel for presenting the driver DR with various pieces of information related to the vehicle 1000, and an accelerator pedal 300 that is one of various operation parts operated by the driver DR when the driver DR operates the vehicle 1000. Note that other examples of the operation parts include a steering wheel, a shift lever (selector) for a transmission, and a brake pedal (none of which is shown).

The air-intake unit 401 and the TWC 601 are connected to the engine 500 with respective pipes P. A path for a gas from the air-intake unit 401 to the engine 500 is hereinafter referred to as a supply side or an air-intake path, whereas a path for a gas from the engine 500 to the TWC 601 is referred to as an exhaust side or an exhaust path. Further, a side on the engine 500 with respect to the TWC 601 is referred to as an upstream side, whereas a side on the opposite side of the engine 500 with respect to the TWC 601 is referred to as a downstream side, based on a flow of an exhaust gas in which an exhaust gas is emitted from the engine 500, introduced into the TWC 601, and is further emitted from the TWC 601.

To give a brief description, power is generated in the vehicle 1000 in the following manner. An air-fuel mixture, which is a mixture of air (intake air) taken from the outside through the air-intake unit 401 and fuel injected from the fuel injection device 501, is compressed in the engine 500. The compressed air-fuel mixture is ignited with a spark plug (not shown). The ignition causes the compressed air-fuel mixture to be exploded and burned, and to be expanded. Pressure generated at this time moves a piston (not shown), thus generating power. Then, a gas generated after such power generation is emitted as an exhaust gas to the exhaust path, such that the exhaust gas is purified by the TWC 601.

The exhaust gas contains toxic substances, namely, nitrogen oxide (NOx), total hydrocarbon (THC), and carbon monoxide (CO). The TWC 601 is capable of collectively removing these three contained substances (purifying an exhaust gas) at respective high removal rates.

The TWC 601 includes a part made of precious metal, such as palladium (Pd), platinum (Pt), and rhodium (Rh), and a part made of ceramics mainly containing ceria ($CeO_2$). The part made of precious metal exerts main catalytic action. The part made of ceramics serves as a promoter. Pd and Pt have a function of oxidizing HC and CO in an exhaust gas to generate carbon dioxide ($CO_2$) and water ($H_2O$). Pd and Rh have a function of reducing NOx in an exhaust gas to generate nitrogen ($N_2$). Ceria has a function of causing absorption and elimination of oxygen ($O_2$). In the TWC 601, when HC and CO are oxidized, necessary oxygen is released from ceria, and when NOx is reduced, generated oxygen is absorbed into (stored in) ceria.

In this embodiment, the TWC 601 in a normal state without deterioration is capable of the following function. Specifically, when the engine 500 is in a stoichiometric state (state in which an air-fuel ratio of an exhaust gas has a stoichiometric value (approximately 14.7)) or a rich state (state in which an air-fuel ratio of an exhaust gas has a value smaller than the stoichiometric value), the TWC 601 removes NOx at a high removal rate of 90% or more (reduces NOx to $N_2$). When the engine 500 is in a stoichiometric state or a lean state (state in which an air-fuel ratio of an exhaust gas has a value larger than the stoichiometric value), the TWC 601 removes HC and CO at a high removal rate of 90% or more (oxidizes HC and CO to $H_2O$ and $CO_2$, respectively).

The vehicle 1000 further includes an upstream air-fuel ratio detection means 701, a downstream air-fuel ratio detection means 702, and a NOx detection means 703. The upstream air-fuel ratio detection means 701 is provided on the pipe P that is located on an upstream side with respect to the TWC 601 and connects the engine 500 and the TWC 601. The downstream air-fuel ratio detection means 702 and the NOx detection means 703 are provided on the pipe P located on a downstream side with respect to the TWC 601. Note that, in FIG. 1, the downstream air-fuel ratio detection means 702 and the NOx detection means 703 are separately illustrated. However, both the means may be formed integrally with each other. In addition, a single detection means may be capable of performing detection in both the means in parallel.

The upstream air-fuel ratio detection means 701 and the downstream air-fuel ratio detection means 702 are disposed to measure an air-fuel ratio of an exhaust gas on an upstream side and a downstream side of the TWC 601, respectively. The NOx detection means 703 is disposed to measure NOx concentration in an exhaust gas on a downstream side of the TWC 601. Outputs from these detection means are used for the purpose of driving control of the vehicle 1000. In this embodiment, in addition to the purpose of driving control, the outputs are also used when a degree of deterioration of removal capability (catalytic capability) of the TWC 601 is diagnosed.

Specifically, in this embodiment, a catalyst deterioration diagnosis system DS1 for diagnosing a degree of deterioration of the TWC 601 includes, as its main components, the upstream air-fuel ratio detection means 701, the downstream air-fuel ratio detection means 702, and the NOx detection means 703 described above, and the ECU 100. Details of a diagnosis conducted with the catalyst deterioration diagnosis system DS1 will be described later.

The ECU 100 includes an electronic circuit including at least one integrated circuit (IC). The electronic circuit includes at least one processor (not shown). Each function of the ECU 100 can be implemented by the processor executing software. The software is described as a program, and is stored in memory (not shown). The memory for storing the program may be included in the ECU 100. For example, the memory is non-volatile or volatile semiconductor memory.

The ECU 100 includes, as its functional components, an upstream air-fuel ratio acquisition part 110A, a downstream air-fuel ratio acquisition part 110B, a fuel injection controller 120, an air-intake controller 130, an integral controller 140, a diagnosis operation controller 150, a NOx concentration acquisition part 160, an oxygen absorption amount calculation part 170, a diagnosis part 180, and a storage 190.

The upstream air-fuel ratio acquisition part 110A and the downstream air-fuel ratio acquisition part 110B acquire an air-fuel ratio signal from the upstream air-fuel ratio detection means 701 and the downstream air-fuel ratio detection means 702, respectively. The air-fuel ratio signal need not necessarily be acquired as an air-fuel ratio itself, and may be acquired as a voltage value or a current value according to the air-fuel ratio.

Hereinafter, an air-fuel ratio on an upstream side of the TWC 601 determined based on a detection result obtained by the upstream air-fuel ratio detection means 701 is referred to as upstream A/F, and an air-fuel ratio on a downstream side of the TWC 601 determined based on a detection result obtained by the downstream air-fuel ratio detection means 702 is referred to as downstream A/F.

The fuel injection controller 120 controls injection of fuel from the fuel injection device 501, in accordance with a control command from the integral controller 140 according to an operation state of the accelerator pedal 300 operated by the driver DR, for example.

The air-intake controller 130 controls intake of air from the air-intake part 401, in accordance with a control command from the integral controller 140 according to an operation state of the accelerator pedal 300 operated by the driver DR, for example. The integral controller 140 gives a control command to each controller of the ECU 100, according to a state of operation performed by the driver DR on operation parts such as the accelerator pedal 300. In this manner, the integral controller 140 integrally controls overall operation of the vehicle 1000.

The diagnosis operation controller 150 controls driving of the vehicle 1000 when a deterioration diagnosis (described later) of the TWC 601 is executed, in accordance with an execution command from the integral controller 140.

The NOx concentration acquisition part 160 acquires a NOx concentration signal from the NOx detection means 703. A value (NOx concentration signal value) indicated by the NOx concentration signal need not necessarily be a concentration value itself, and may be a voltage value or a current value according to the concentration value. Hereinafter, NOx concentration on a downstream side of the TWC 601 determined based on a detection result obtained by the NOx detection means 703 is simply referred to as NOx concentration (of an exhaust gas).

The oxygen absorption amount calculation part 170 calculates an absorption amount of oxygen in the TWC 601, under control performed by the diagnosis operation controller 150. The calculation is performed based on the air-fuel ratio signal given from the upstream air-fuel ratio detection means 701.

The diagnosis part 180 diagnoses a degree of deterioration of the TWC 601, under control performed by the diagnosis operation controller 150. The diagnosis is conducted based on the NOx concentration signal acquired by the NOx concentration acquisition part 160 and the absorption amount of oxygen in the TWC 601 calculated by the oxygen absorption amount calculation part 170.

The storage 190 stores various pieces of information, such as various programs and pieces of data required during driving of the vehicle 1000, and a driving condition and a diagnosis threshold value at the time of a deterioration diagnosis.

In the vehicle 1000, an additional catalyst 602 may be provided on a further downstream side of the downstream air-fuel ratio detection means 702 and the NOx detection means 703. For example, the additional catalyst 602 is another TWC, a gasoline particulate filter (GPF), or a selective catalytic reduction (SCR) catalyst. In this case, an exhaust gas from the engine 500 is more preferably purified.

<Deterioration Diagnosis of TWC>

Next, a deterioration diagnosis of the TWC 601 conducted in this embodiment will be described. FIG. 2A and FIG. 2B are two sets of graphs contrastingly showing a control mode of the engine 500 when a deterioration diagnosis according to this embodiment is conducted, and a control mode of the engine 500 in a known and general Cmax method (hereinafter simply referred to as a Cmax method).

Specifically, FIG. 2A shows time-dependent change of a control target value of upstream A/F, a measured value of downstream A/F, and a measured value of NOx concentration in a case of a Cmax method. FIG. 2B shows time-dependent change of those values in a deterioration diagnosis according to this embodiment.

First, description for a Cmax will be given. In a Cmax method, active control is performed for controlling an operation state of the engine 500, in a manner that a control target value of upstream A/F changes between a set value AFa in a lean state and a set value AFb in a rich state in a stepped manner, as shown in FIG. 2A. In this case, an exhaust gas temperature is set to a predetermined temperature at which the active control can be performed, in a range of 600° C. or higher (in an actual situation, a temperature margin of approximately 30° C. higher or lower than the above-mentioned temperature is allowable). Nevertheless, at least in the present circumstances, performing active control is difficult when an exhaust gas temperature exceeds 900° C. Thus, substantially, an upper limit value of an exhaust gas temperature is 900° C.

An operation state of the engine 500 with a control target value of upstream A/F being set to AFa is hereinafter referred to as a lean operation state, and an operation state of the engine 500 with a control target value of upstream A/F being set to AFb is referred to as a rich operation state.

More specifically, excessive oxygen contained in an exhaust gas from the engine 500 is absorbed by ceria provided in the TWC 601 for a certain period after an operation state is changed to a lean operation state. Consequently, downstream A/F is maintained in a rich state. After that, when an oxygen absorption amount of ceria is saturated, oxygen contained in an exhaust gas is not absorbed by ceria anymore and flows onto a downstream side of the TWC 601. Accordingly, a measured value of downstream A/F is gradually increased. Then, at timings when the measured value of downstream A/F reaches a lean threshold value THa (time points ta1, ta2, ta3, . . . indicated by solid arrows AR1 in FIG. 2A), a control target value of upstream A/F is set to AFb, and the operation state transitions to a rich operation state.

This time, an amount of oxygen contained in an exhaust gas from the engine 500 is reduced less than an amount achieving a stoichiometric state. Accordingly, in the TWC 601, oxygen that has been absorbed into ceria is released. Consequently, downstream A/F is maintained in a lean state for a certain period. Eventually, when all oxygen is released from ceria, the once increased measured value of downstream A/F is gradually reduced.

Then, at timings when the measured value of downstream A/F reaches a rich threshold value THb (time points tb1, tb2, tb3, . . . indicated by one-dot-one-dash arrows AR2 in FIG. 2A), the control target value of upstream A/F is set to AFa again, and the operation state transitions to a lean operation state.

Note that, in FIG. 2A, for the sake of simplification of the graphs, the length of time from when a measured value of downstream A/F reaches the lean threshold value THa to when the measured value reaches the rich threshold value THb (tb1−ta1, tb2−ta2, tb3−ta3, . . . ) and the length of time from when the measured value reaches the rich threshold value THb to when the measured value reaches the lean threshold value THa (ta2−tb1, ta3−tb2, . . . ) are all the same. In actuality, however, these lengths of time may be different from each other. Usually, each of such lengths of time is approximately several seconds at most.

After this, a lean operation state and a rich operation state are repeated as necessary. Then, based on a measured value of upstream A/F obtained after a lean operation state and a rich operation state are repeated a predetermined number of times or repeated for a predetermined period as in the manner described above (based on a time integration value with respect to predetermined time, to be specific), an oxygen absorption amount of ceria provided in the TWC 601 is estimated. Then, based on a value of the obtained oxygen absorption amount, a degree of deterioration of the TWC 601 is diagnosed. In other words, in a Cmax method, a diagnosis that the function of the entire TWC 601 is deteriorated is made, based on the fact that oxygen absorption capability of ceria is reduced.

Next, description will be given of a deterioration diagnosis according to this embodiment. The deterioration diagnosis according to this embodiment is conducted with the catalyst deterioration diagnosis system DS1 provided in the vehicle 1000.

The deterioration diagnosis according to this embodiment is similar to the deterioration diagnosis of a known Cmax method in a point that a lean operation state and a rich operation state are repeated and in a manner of transition from a lean operation state to a rich operation state, but has its feature in transition from a rich operation state to a lean operation state. Control of the engine 500 at the time of this diagnosis is performed by the diagnosis operation controller 150. Also in the deterioration diagnosis according to this embodiment, an exhaust gas temperature is set to a predetermined temperature of 600° C. or higher (in an actual situation, a temperature margin of approximately 30° C. higher or lower than the above-mentioned temperature is allowable). A temperature of an exhaust gas at the time of this deterioration diagnosis is referred to as a diagnosis temperature. At least in the present circumstances, as described above, performing active control is difficult when an exhaust gas temperature exceeds 900° C. Thus, as for the diagnosis temperature as well, substantially, an upper limit value of an exhaust gas temperature is 900° C.

Specifically, as shown in FIG. 2B, regarding transition from a lean operation state to a rich operation state, similarly to a known Cmax method, at timings when a measured value of downstream A/F reaches a lean threshold value THa (time points tc1, tc2, . . . indicated by solid arrows AR3 in FIG. 2B), a control target value of upstream A/F is set to AFb, and an operation state transitions to a rich operation state.

Regarding a measured value of downstream A/F, the downstream air-fuel ratio acquisition part 110B may acquire the measured value having been calculated in the downstream air-fuel ratio detection means 702 from its detection value, and then may provide the acquired value to the diagnosis operation controller 150. Alternatively, the downstream air-fuel ratio acquisition part 110B may acquire a detection value in the downstream air-fuel ratio detection means 702, calculate the measured value, and then provide the calculated value to the diagnosis operation controller 150. Or else, an air-fuel ratio signal corresponding to the measured value may be provided from the downstream air-fuel ratio detection means 702 to the diagnosis operation controller 150 via the downstream air-fuel ratio acquisition part 110B, and the diagnosis operation controller 150 may process the signal value as a value corresponding to the measured value.

While a rich operation state is continued, eventually, similarly to the case of a Cmax method, all oxygen that has been absorbed into ceria is released, and at certain timings (time points td1, td2, . . . in FIG. 2B), the measured value of downstream A/F reaches a rich threshold value THb. However, in the deterioration diagnosis according to this embodiment, at these timings, the operation state does not transition to a lean operation state yet (these are indicated by x marks CR in FIG. 2B). Instead, at timings that are a predetermined period Δt after those timings (time points te1, te2, . . . indicated by one-dot-one-dash arrows AR4 in FIG. 2B), the operation state transitions to a lean operation state. Then, after this, similarly, a lean operation state and a rich operation state are repeated. Here, the period Δt is a value experimentally determined in advance, and is set to approximately from 1 second to 5 seconds.

In this manner, when a rich operation state is continued longer than that in a known Cmax method, as shown in the lowermost graph of FIG. 2B, transition of NOx concentration while a rich operation state is continued varies depending on an individual TWC 601. Some TWCs 601 may transition keeping substantially zero as indicated by a solid line. Other TWCs 601 may show a tendency that NOx concentration gradually increases as time passes by as indicated by a broken line, a one-dot-one-dash line, and a two-dot-one-dash line. In addition, as in cases indicated by the one-dot-one-dash line and the two-dot-one-dash line, a NOx concentration value may have a positive value immediately after transition to a rich operation state.

It is obvious that NOx detected by the NOx detection means 703 is NOx not removed in the TWC 601 and is exhausted to a downstream side. As a result of keen examination made by the inventor of the present invention, it was found that, provided that a temperature of an exhaust gas is the same, there is a tendency that a value of NOx concentration is larger as the TWC 601 is further deteriorated, as indicated by an arrow AR5. This signifies that there is a correlation between NOx concentration in a rich operation state and a degree of deterioration of NOx reduction capability of the TWC 601.

In contrast, it was also confirmed that, regarding NOx concentration in a lean operation state, even when a lean operation state is continued even after a measured value of downstream A/F reaches the lean threshold value THa, there is no special correlation with a degree of deterioration of the TWC 601.

In this embodiment, based on the above findings, a degree of deterioration of NOx reduction capability of the TWC 601 (of Pd and Rh being precious metal, to be more specific) is diagnosed based on NOx concentration detected in a period from when an operation state transitions from a lean operation state to a rich operation state to when the operation state transitions to a lean operation state again, in the catalyst deterioration diagnosis system DS1 provided in the vehicle 1000.

Specifically, in the catalyst deterioration diagnosis system DS1, first, under control performed by the diagnosis operation controller 150, a temperature of an exhaust gas is kept at a diagnosis temperature within a range between 600° C. and 900° C., and as described above, transition from a lean operation state to a rich operation state at timings when a measured value of downstream A/F reaches the lean threshold value THa and transition from a rich operation state to a lean operation state at timings that are a predetermined period Δt after the timings when the measured value of downstream A/F reaches a rich threshold value THb are repeated. Control (active control) of the engine 500 performed in the above manner is referred to as diagnosis operation.

Then, in parallel with this, when the engine 500 is in a diagnosis operation state, the NOx concentration acquisition part 160 acquires a NOx concentration signal from the NOx detection means 703 at least during a rich operation state of the diagnosis operation state, and provides a signal value thereof to the diagnosis part 180.

The diagnosis part 180 compares the provided NOx concentration signal value and a threshold value (first threshold value) stored in the storage 190 in advance. If the NOx concentration signal value exceeds the threshold value, the diagnosis part 180 diagnoses that deterioration exceeding an allowable limit occurs in NOx reduction capability of the TWC 601. If the NOx concentration signal value is equal to or less than the threshold value, the diagnosis part 180 diagnoses that deterioration exceeding an allowable limit does not occur in NOx reduction capability of the TWC 601. The threshold value is described in a format and a value according to a format of the NOx signal value provided to the diagnosis part 180. Note that an average value of NOx concentration signal values that are acquired every time an operation state reaches a rich operation state may be compared to the threshold value. Alternatively, threshold values may be set in a stepped manner, and respective threshold values and NOx concentration values may be compared to each other. In this manner, a degree of deterioration of NOx reduction capability of the TWC 601 as a diagnosis target may be diagnosed in a stepped manner.

As can be understood from the above description, one clear difference between a Cmax method and a deterioration diagnosis according to this embodiment lies in a period in which the engine 500 is kept in a rich operation state. Therefore, provided that a degree of deterioration of NOx reduction capability in the TWC 601 is the same, even in a case where duration of a rich operation state is short as in the case of a Cmax method, in actuality, a flow of NOx from the TWC 601 to a downstream side should occur. Accordingly, in one aspect, it may seem that a deterioration diagnosis can be conducted by controlling an operation state of the engine 500 with a Cmax method and measuring NOx concentration.

However, in view of a short period of a rich operation state and responsiveness and detection errors of the NOx detection means 703, for example, there is a high probability that NOx concentration in a rich operation state may be usually substantially zero or may have a value close to zero as shown in the lowermost graph of FIG. 2A, unless NOx reduction capability of the TWC 601 is deteriorated in a considerable degree. Therefore, even if an operation state of the engine 500 is controlled similarly to a Cmax method, accurately diagnosing NOx reduction capability is difficult.

In contrast, in the deterioration diagnosis of this embodiment, similarly to a Cmax method, an oxygen absorption amount of ceria provided in the TWC 601 is estimated, and based on a value of the estimation, a degree of deterioration of oxygen absorption capability of ceria can also be diagnosed.

Specifically, the following is utilized. A value obtained by integrating a difference value between a measured value of upstream A/F when the engine 500 is in a diagnosis operation state, which is indicated by a broken line in the uppermost graph of FIG. 2B, and a stoichiometric value (approximately 14.7), with respect to time while the engine 500 is in a lean operation state, corresponds to an oxygen absorption amount of ceria provided in the TWC 601 in one absorption. More specifically, the difference value is integrated from time when the measured value of upstream A/F has a stoichiometric value or more after a control target value of upstream A/F transitions to a lean set value AFa to time when the measured value of upstream A/F transitions to a rich set value AFb (to when a measured value of downstream A/F reaches a lean threshold value THa). An absolute value of a value obtained by integrating the difference value with respect to time from when the measured value of upstream A/F has a stoichiometric value or less to when the measured value of downstream A/F reaches a rich threshold value THb while the engine 500 is in a rich operation state corresponds to an oxygen release amount in one release. For example, an area of a hatched part M1 of FIG. 2B corresponds to an oxygen absorption amount in one absorption, and an absolute value of an area of a hatched part M2 corresponds to an oxygen release amount in one release.

Then, area values corresponding to those oxygen absorption amount in one absorption and oxygen release amount in one release are calculated every time inversion between a lean operation state and a rich operation state is repeated while a diagnosis operation continues, and an average oxygen absorption amount being an average value of all the obtained calculation values is regarded as an oxygen absorption amount indicating oxygen absorption capability of ceria provided in the TWC 601.

An oxygen absorption amount calculated in the above manner is equivalent to oxygen absorption capability calculated in a known Cmax method.

Therefore, in the catalyst deterioration diagnosis system DS1, under control performed by the diagnosis operation controller 150, when the engine 500 enters a diagnosis operation state, in parallel with acquisition of NOx concentration signals in the NOx concentration acquisition part 160 described above, the oxygen absorption amount calculation part 170 repeatedly calculates an oxygen absorption amount and an oxygen release amount of ceria in the above manner based on air-fuel ratio signals from the upstream air-fuel ratio detection means 701, calculates an average oxygen absorption amount being an average value thereof, and provides the average value to the diagnosis part 180.

In parallel with diagnosis of NOx reduction capability described above, the diagnosis part 180 compares the provided average oxygen absorption amount and a threshold value (second threshold value) stored in the storage 190 in advance. If the average oxygen absorption amount is below the threshold value, the diagnosis part 180 diagnoses that deterioration exceeding an allowable limit occurs in oxygen absorption capability of the TWC 601. If the average oxygen absorption amount is equal to or more than the threshold value, the diagnosis part 180 diagnoses that deterioration exceeding an allowable limit does not occur in oxygen absorption capability of the TWC 601. Alternatively, threshold values may be set in a stepped manner in association with a degree of deterioration of oxygen absorption capability, and respective threshold values and an average oxygen absorption amount may be compared to each other. In this manner, a degree of deterioration of oxygen absorption capability of the TWC 601 as a diagnosis target may be diagnosed in a stepped manner.

As described above, in the catalyst deterioration diagnosis system DS1 according to this embodiment, as a deterioration diagnosis of the TWC 601, a diagnosis of NOx reduction capability and a diagnosis of oxygen absorption capability similarly to those in a known method can be conducted in parallel. In addition, as a result of keen examination made by the inventor of the present invention, it is confirmed that there is not necessarily a correlation between both diagnosis results. This signifies that a deterioration state of the TWC 601 can be more properly understood in a deterioration diagnosis conducted in the catalyst deterioration diagnosis system DS1 according to this embodiment than in a deterioration diagnosis with a Cmax method in which only oxygen absorption capability is used as an index.

As described above, according to this embodiment, similarly to a known Cmax method, a lean operation state and a rich operation state are alternately repeated in an engine, and transition from a rich operation state to a lean operation state is performed after a predetermined period has elapsed since a measured value of an air-fuel ratio on a downstream side of a TWC reaches a rich threshold value, and in this condition, NOx is detected on a downstream side of the TWC during a rich operation state, and NOx concentration values determined based on the detection are compared to a predetermined threshold value. In this manner, regarding NOx reduction capability of the TWC, a degree of deterioration can be diagnosed.

In addition, an oxygen absorption amount of the TWC is calculated based on a value obtained through time integration of a measured value of an air-fuel ratio on an upstream side of the TWC, and the calculated value is compared to a threshold value. In this manner, also regarding oxygen absorption capability of the TWC, a degree of deterioration can be diagnosed.

Moreover, these diagnoses of NOx reduction capability and oxygen absorption capability can be conducted in parallel, and there is no correlation between manners of deterioration of both the NOx reduction capability and the oxygen absorption capability. Therefore, according to this embodiment, as compared to a known Cmax method, a state of deterioration of a TWC can be understood in more detail.

EXAMPLES

Example 1

Four TWCs 601 with different degrees of deterioration were prepared, and each was mounted in an actual vehicle 1000. Active control operation of the engine 500 was performed, and behavior of NOx concentration on a downstream side was analyzed for each of the TWCs 601.

As the vehicle 1000, a gasoline vehicle including an engine 500 with 4.6-liter displacement (V8 engine non-turbo) was used. As the TWC 601, a new product (hereinafter also referred to as a fresh or a fresh product), and three a hydrothermal aging products, obtained by subjecting fresh products to hydrothermal aging for 2 hours, 4 hours, and 10 hours at 1000° C., were prepared, to simulate a deterioration state in different degrees. A TWC 601 subjected to longer hydrothermal aging time corresponds to a TWC with a more remarkable degree of deterioration. Hydrothermal aging was performed in an atmosphere containing 2% of $O_2$, 10% of $H_2O$, and the rest of $N_2$.

Further, known air-fuel ratio sensors were used as the upstream air-fuel ratio detection means 701 and the downstream air-fuel ratio detection means 702, and a mass analyzer was used as the NOx detection means 703.

Active control operation was performed on the condition that an engine speed of the engine 500 was kept at 2000 rpm, and a lean operation state with an excess air ratio $\lambda$, =1.04 and a rich operation state with an excess air ratio $\lambda$, =0.96 were alternately repeated for 30 seconds in each state. Specifically, AFa=1.04×14.7≈15.29, and AFb=0.96× 14.7≈14.11. Temperatures of an exhaust gas were caused to differ in four different levels of 400° C., 500° C., 600° C., and 700° C. To achieve each exhaust gas temperature, a fuel injection amount from the fuel injection device 501 and intake air from the air-intake unit 401 were variably controlled.

FIG. 3A to FIG. 3D are graphs in which time-dependent changes of NOx concentration are organized for respective exhaust gas temperatures in cases where the four TWCs 601 are mounted in the vehicle 1000, respectively.

As shown in FIG. 3A to FIG. 3D, when an exhaust gas temperature was 600° C., high NOx concentration was detected in a lean operation state regardless of difference of TWCs, and NOx was detected also in a rich operation state except a fresh product. Further, also when an exhaust gas temperature was 700° C., a trace of NOx was detected in a rich operation state. In contrast, when an exhaust gas temperature was 400° C. and 500° C., NOx was not detected in a rich operation state even if TWCs subjected to hydrothermal aging were used.

Figure 4:
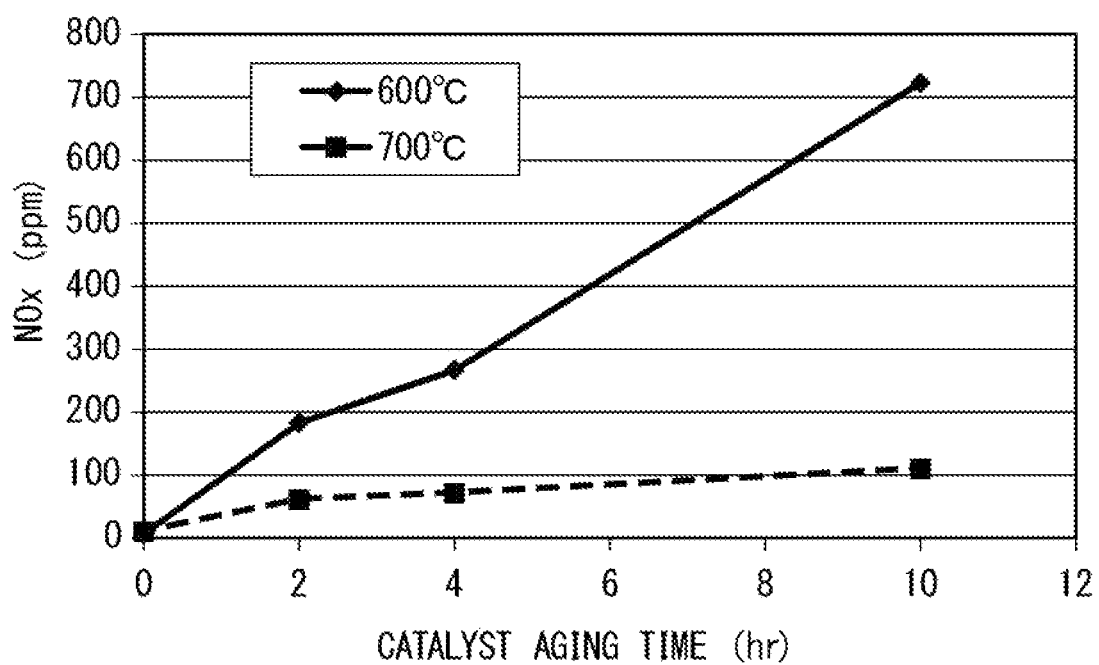
FIG. 4 is a graph showing a relationship between hydrothermal aging time and a maximum value of NOx concentration in a rich operation state in a case where an exhaust gas temperature is 600° C. and 700° C.

FIG. 4 is a graph showing a relationship between hydrothermal aging time ("catalyst aging time" in FIG. 4) and a maximum value of NOx concentration in a rich operation state in a case where an exhaust gas temperature is 600° C. and 700° C. Note that data when "catalyst aging time" is 0 hours (0 hr) is data of a fresh product.

With reference to FIG. 4, it can be found that, in each case, there is a tendency that NOx concentration is larger as hydrothermal aging time is larger.

Such results suggest that, as in the embodiment described above, a diagnosis of NOx reduction capability of a TWC is possible by setting a period of a rich operation state in active control in which a lean operation state and a rich operation state are alternately repeated to be sufficiently longer (30 seconds in this embodiment) than a period (approximately several seconds at most) to be in a rich operation state in active control in a usual Cmax method.

Example 2

The four types of TWCs 601 with a (simulated) different deterioration state used in the Example 1 were mounted in the same vehicle 1000 as that in the Example 1, and with a known Cmax method, an oxygen absorption amount of cases where an exhaust gas temperature was set to 600° C. and 700° C. was measured. Active control operation was performed on the condition that an engine speed of the engine 500 was kept at 2000 rpm. To achieve each exhaust gas temperature, a fuel injection amount from the fuel injection device 501 and intake air from the air-intake unit 401 were variably controlled. Further, a lean operation state and a rich operation state were performed 10 times each, an average value of oxygen absorption amounts or oxygen release amounts after a total of 20 times of oxygen absorption or oxygen release was regarded as an oxygen absorption amount of each TWC. Duration of each operation state was approximately 3 seconds.

Figure 5A:
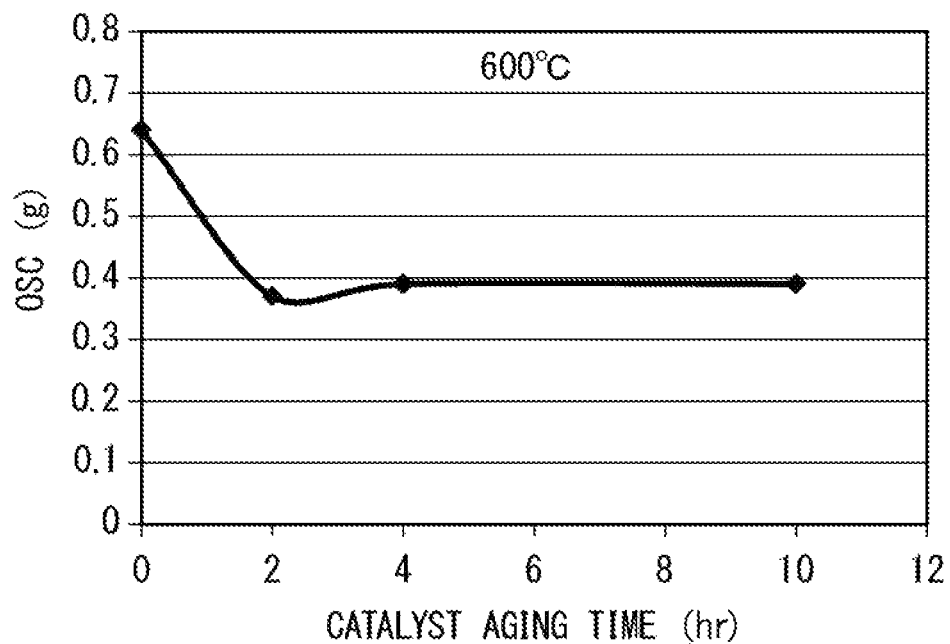
FIG. 5A and FIG. 5B are graphs showing a relationship between hydrothermal aging time and an oxygen absorption amount in cases where an exhaust gas temperature is 600° C. and 700° C., respectively.
Figure 5B:
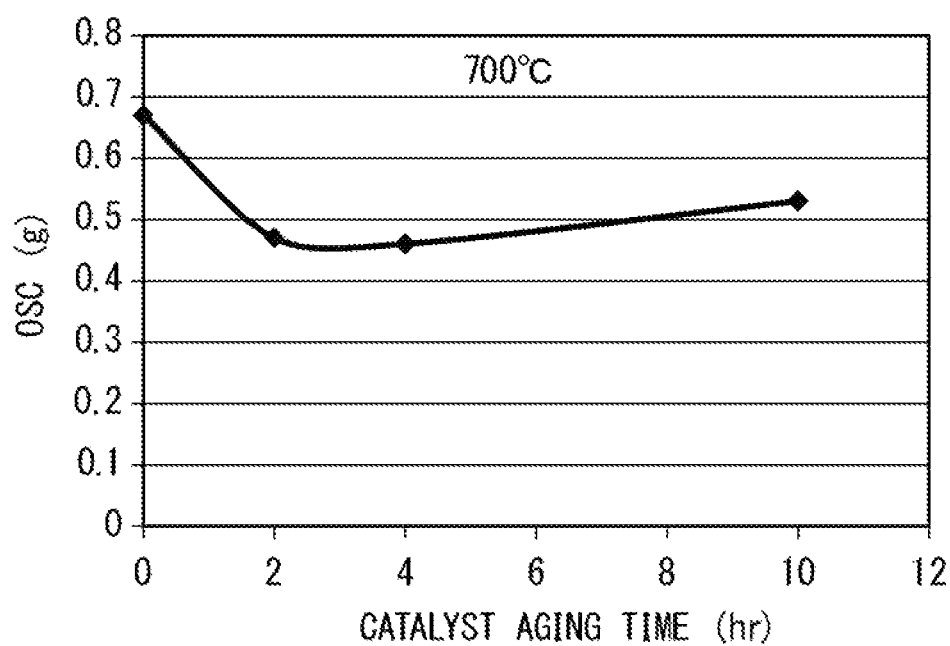

FIG. 5A and FIG. 5B are graphs showing a relationship between hydrothermal aging time ("catalyst aging time" in FIG. 5A and FIG. 5B) and an oxygen absorption amount ("OSC" in FIG. 5A and FIG. 5B) in cases where an exhaust gas temperature is 600° C. and 700° C., respectively.

In both of a case where an exhaust gas temperature shown in FIG. 5A is 600° C. and a case where an exhaust gas temperature shown in FIG. 5B is 700° C., only a fresh product had a larger oxygen absorption amount than the other three hydrothermal aging products, and no remarkable difference was observed between the three hydrothermal aging products. Such results suggest that an oxygen absorption amount of the TWC 601 reduces in a relatively short period after the TWC 601 is started to be used, and does not significantly change after that.

Further, it is determined that such change of an oxygen absorption amount does not have a correlation with change of NOx concentration shown in FIG. 4. This suggests that a degree of deterioration of the TWC 601 cannot be necessarily properly judged only with evaluation of oxygen absorption capability that has hitherto been performed, and that a diagnosis technique of the embodiment described above with which oxygen absorption capability and NOx reduction capability can be evaluated in parallel can more precisely diagnose a state of deterioration of the TWC 601.

While the invention has been shown and described in detail, the foregoing description is in all aspects illustrative and not restrictive. It is therefore understood that numerous modifications and variations can be devised without departing from the scope of the invention.

What is claimed is:

1. A system for diagnosing a deterioration degree of a catalyst that purifies an exhaust gas emitted from an internal combustion engine, the catalyst being provided in an exhaust path for the exhaust gas from the internal combustion engine, a side on the catalyst with respect to the internal combustion engine being defined as an upstream side with respect to the catalyst in the exhaust path, a side on an opposite side of the upstream side being defined as a downstream side with respect to the catalyst in the exhaust path, the system comprising:

a downstream air-fuel ratio detector provided on the downstream side in the exhaust path;

a NOx detector provided on the downstream side in the exhaust path;
an electronic control unit (ECU) including a processor coupled to a memory storing instructions that when executed by the processor configure the ECU to
control air intake and fuel injection to the internal combustion engine, thereby to control an operation state of the internal combustion engine, and
diagnose a deterioration degree of the catalyst; and
a storage configured to store diagnosis threshold values determined in advance, wherein
the ECU is configured to be capable of causing the internal combustion engine to perform a diagnosis operation, wherein in the diagnosis operation, under control performed by the ECU,
a temperature of the exhaust gas is kept at a predetermined diagnosis temperature of 600° C. or higher,
when the internal combustion engine is in a lean operation state, at a timing when a downstream air-fuel ratio reaches a predetermined lean threshold value, the internal combustion engine is caused to transition to a rich operation state, and
when the internal combustion engine is in a rich operation state, at a timing that is a predetermined period after the timing when a downstream air-fuel ratio reaches a predetermined rich threshold value, the internal combustion engine is caused to transition to a lean operation state,
the lean operation state is an operation state of the internal combustion engine when an air-fuel ratio of the exhaust gas emitted from the internal combustion engine is larger than a stoichiometric value,
the rich operation state is an operation state of the internal combustion engine when an air-fuel ratio of the exhaust gas emitted from the internal combustion engine is smaller than a stoichiometric value,
the downstream air-fuel ratio is an air-fuel ratio of the exhaust gas on the downstream side determined based on a detection result obtained by the downstream air-fuel ratio detector, and
the ECU compares NOx concentration on the downstream side determined based on a detection result obtained by the NOx detector during the rich operation state to a first diagnosis threshold value of the diagnosis threshold values, thereby to diagnose a degree of deterioration of NOx reduction capability of the catalyst.

2. The catalyst deterioration diagnosis system according to claim 1, further comprising
an upstream air-fuel ratio detector configured to detect an air-fuel ratio of the exhaust gas on the upstream side of the exhaust path, wherein
the ECU is further configured to
compare an average oxygen absorption amount of the catalyst calculated as an average value of an oxygen absorption amount of the catalyst in one absorption and an oxygen release amount of the catalyst in one release to a second diagnosis threshold value of the diagnosis threshold values, thereby to diagnose a degree of deterioration of oxygen absorption capability of the catalyst,
calculate the oxygen absorption amount by integrating a difference value between an upstream air-fuel ratio and a stoichiometric value with respect to time from when the upstream air-fuel ratio has a stoichiometric value or more to when the downstream air-fuel ratio reaches the lean threshold value, and
calculate the oxygen release amount by integrating a difference value between an upstream air-fuel ratio and a stoichiometric value with respect to time from when the upstream air-fuel ratio has a stoichiometric value or less to when the downstream air-fuel ratio reaches the rich threshold value, and wherein
the upstream air-fuel ratio is an air-fuel ratio of the exhaust gas on the upstream side determined based on an air-fuel ratio detection value obtained by the upstream air-fuel ratio detector.

3. A method of diagnosing a deterioration degree of a catalyst that purifies an exhaust gas emitted from an internal combustion engine, the catalyst being provided in an exhaust path for the exhaust gas from the internal combustion engine, a side on the catalyst with respect to the internal combustion engine being defined as an upstream side with respect to the catalyst, a side on an opposite side of the upstream side being defined as a downstream side with respect to the catalyst, the method comprising the steps of:
using an electronic control unit (ECU) including a processor coupled to a memory storing instructions that when executed by the processor configure the ECU to
a) control air intake and fuel injection to the internal combustion engine, thereby to cause the internal combustion engine to perform diagnosis operation; and
b) diagnose a deterioration degree of the catalyst, wherein in the step a),
a temperature of the exhaust gas is kept at a predetermined diagnosis temperature of 600° C. or higher,
when the internal combustion engine is in a lean operation state, at a timing when a downstream air-fuel ratio being an air-fuel ratio of the exhaust gas on the downstream side reaches a predetermined lean threshold value, the internal combustion engine is caused to transition to a rich operation state, and
when the internal combustion engine is in a rich operation state, at a timing that is a predetermined period after the timing when the downstream air-fuel ratio reaches a predetermined rich threshold value, the internal combustion engine is caused to transition to a lean operation state,
the lean operation state is an operation state of the internal combustion engine when an air-fuel ratio of the exhaust gas emitted from the internal combustion engine is larger than a stoichiometric value,
the rich operation state is an operation state of the internal combustion engine when an air-fuel ratio of the exhaust gas emitted from the internal combustion engine is smaller than a stoichiometric value, and
in the step b), a concentration of NOx in the exhaust gas on the downstream side during the rich operation state is compared to a first diagnosis threshold value stored in a storage in advance, thereby to diagnose a degree of deterioration of NOx reduction capability of the catalyst.

4. The catalyst deterioration diagnosis method according to claim 3, wherein
in the step b), the ECU
compares an average oxygen absorption amount of the catalyst calculated as an average value of an oxygen absorption amount of the catalyst in one absorption and an oxygen release amount of the catalyst in one release to a second diagnosis threshold value stored in the storage in advance, thereby to diagnose a degree of deterioration of oxygen absorption capability of the catalyst, calculate the oxygen absorption amount by integrating a difference value between an upstream air-fuel ratio being an air-fuel ratio on the upstream side and a stoichiometric value with respect to time from when the upstream air-fuel ratio has a stoichiometric value or more to when the downstream air-fuel ratio reaches the lean threshold value, and calculate the oxygen release amount by integrating a difference value between the upstream air-fuel ratio and a stoichiometric value with respect to time from when the upstream air-fuel ratio has a stoichiometric value or less to when the downstream air-fuel ratio reaches the rich threshold value.

* * * * *